(12) United States Patent
Nojiri et al.

(10) Patent No.: US 12,128,744 B2
(45) Date of Patent: Oct. 29, 2024

(54) GLASS RUN

(71) Applicants: TOYODA GOSEI CO., LTD., Kiyosu (JP); TOYOTA JIDOSHA KABUSHIKI KAISHA, Toyota (JP)

(72) Inventors: Masatoshi Nojiri, Kiyosu (JP); Sagiri Kato, Toyota (JP); Masaaki Wakahara, Toyota (JP)

(73) Assignees: TOYODA GOSEI CO., LTD., Aichi-pref. (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/951,309

(22) Filed: Sep. 23, 2022

(65) Prior Publication Data

US 2023/0106306 A1 Apr. 6, 2023

(30) Foreign Application Priority Data

Oct. 1, 2021 (JP) .................................. 2021-162597
Jul. 21, 2022 (JP) .................................. 2022-116131

(51) Int. Cl.
*B60J 10/76* (2016.01)
*B60J 10/50* (2016.01)

(52) U.S. Cl.
CPC ............... *B60J 10/76* (2016.02); *B60J 10/50* (2016.02)

(58) Field of Classification Search
CPC ............. B60J 10/76; B60J 10/16; B60J 10/50
See application file for complete search history.

(56) References Cited

U.S. PATENT DOCUMENTS

| 9,475,374 | B2 * | 10/2016 | Murree | ............... | B29D 99/0053 |
| 10,766,433 | B2 * | 9/2020 | Tomoyasu | ............... | B60J 10/16 |
| 11,117,454 | B2 * | 9/2021 | Zia | ............... | B60J 10/70 |
| 11,247,546 | B2 * | 2/2022 | Tooker | ............... | B29C 48/16 |
| 11,479,088 | B2 * | 10/2022 | Nojiri | ............... | B60J 10/76 |
| 11,554,651 | B2 * | 1/2023 | Kamitani | ............... | B60J 10/76 |
| 2020/0101828 | A1 * | 4/2020 | Oshima | ............... | B60J 10/16 |

FOREIGN PATENT DOCUMENTS

| JP | 2018-149984 A | 9/2018 |
| JP | 2021-024388 A | 2/2021 |

* cited by examiner

*Primary Examiner* — Daniel J Troy
*Assistant Examiner* — Susan M. Heschel
(74) *Attorney, Agent, or Firm* — Posz Law Group, PLC

(57) ABSTRACT

A glass run includes a bottom wall, a vehicle outer side wall, and a vehicle inner side wall as a basic skeleton. The basic skeleton is attached to a door frame groove portion formed in a door frame, the glass run guiding upward and downward movement of a door glass. In the glass run, a vehicle inner side of the vehicle outer side wall is formed with a thick portion that protrudes toward a vehicle inner side, comes into sliding contact with the door glass, and has higher hardness than hardness of a vehicle outer side wall body portion of the vehicle outer side wall.

12 Claims, 4 Drawing Sheets

RELATED ART

GLASS RUN

CROSS REFERENCE TO RELATED APPLICATION

This application claims the priority benefit of Japanese Patent Application No. 2021-162597 filed on Oct. 1, 2021, and Japanese Patent Application No. 2022-116131 filed on Jul. 21, 2022. The entirely of the above-mentioned patent applications are hereby incorporated by reference herein and made a part of this application.

BACKGROUND OF THE INVENTION

(1) Field of the Invention

The present invention relates to a glass run attached to a door frame formed on a door of a vehicle such as an automobile.

(2) Description of Related Art

Improvement in quietness of a vehicle such as an automobile increases comfort of an occupant, so that improvement in product appeal is high. Electric vehicles, which are expected to rapidly spread in the future, have no engine that is conventionally mounted, and therefore, road noise and wind noise become apparent as main noise remaining due to elimination of the engine sound. Therefore, the need for reduction technique for road noise and wind noise has increased more than before.

The wind noise is a sound that is generated outside the vehicle interior when the wind during traveling hits the vehicle and penetrates the vehicle body and reaches the vehicle interior. In the penetration path, it is known that the contribution of the door glass close to the position of the ear of the occupant in the vehicle interior is the largest, and measures such as an increase in the plate thickness of the door glass and setting of an acoustic glass are taken, but an increase in weight and an increase in cost are obstacles.

In addition to the door glass, in a glass run, which is a sealing material between the door glass and the door frame, noise can be reduced particularly in a high frequency range of 1 kHz or more, and studies on increasing this reduction effect have been conducted.

As shown in FIG. 7, a glass run 110 is formed in a channel shape (U-shaped in cross section) with a bottom wall 200, a vehicle outer side wall 300, and a vehicle inner side wall 400 as a basic skeleton. A cover lip 340 that comes into contact with a door glass 600 is formed at a tip end of the vehicle outer side wall 300, and a vehicle outer side seal lip 330 that protrudes toward the bottom wall 200 side and comes into sliding contact with the door glass 600 is formed on the vehicle inner side of the vehicle outer side wall 300 on the bottom wall 200 side relative to the cover lip 340.

On the other hand, a vehicle inner side first seal lip 410 that is in sliding contact with the door glass 600 is formed at the tip end of the vehicle inner side wall 400, a sub lip 420 protruding in a direction opposite to the vehicle inner side first seal lip 410 is formed toward the vehicle outer side on the vehicle outer side on the bottom wall 200 side relative to the vehicle inner side first seal lip 410 of the vehicle inner side wall 400, and the vehicle inner side of the vehicle inner side first seal lip 410 comes into contact with the sub lip 420 when the vehicle inner side first seal lip 410 comes into sliding contact with the door glass 600. Furthermore, at the tip end of the vehicle inner side wall 400, a cover lip 430 extending from the tip end of the vehicle inner side wall 400 so as to sandwich a vehicle inner side frame of a door frame 310 with the vehicle inner side wall 400 is formed (JP 2018-149984 A).

As a noise reduction technique by a glass run, for example, a technique described in JP 2021-24388 A is known. JP 2021-24388 A relates to a glass run penetration route indicated by an arrow A of FIG. 7. Note that the same reference numerals are given to common parts with those in JP 2018-149984 A.

As shown in FIG. 8, in the glass run 110 of JP 2021-24388 A, the vehicle inner side seal lip has the vehicle inner side first seal lip 410 and a vehicle inner side second seal lip 440 formed on the bottom wall 200 side relative to the vehicle inner side first seal lip 410, and the vehicle inner side first seal lip 410 and the vehicle inner side second seal lip are formed toward the bottom wall 200 side and do not come into contact with each other at the time of sliding contact with the door glass 600.

As a result, since the glass run 110 has the plurality of vehicle inner side first seal lips 410 and the plurality of vehicle inner side second seal lips 440 formed on the bottom wall 200 side relative to the vehicle inner side first seal lips, the shielding effect of penetrated sound in the glass run penetration route increases, and noise can be reduced.

SUMMARY OF THE INVENTION

As a technique for reducing noise due to wind noise, it is also possible to reduce vibration by using so-called impedance matching in which vibration energy of a door glass is efficiently transmitted and dissipated to a component in contact with the door glass. However, at the present time point, such a technique has not been sufficiently studied.

The present invention focuses on impedance matching, and provides a glass run capable of efficiently transmitting and dissipating vibration energy of a door glass and reducing noise due to wind noise.

In order to solve the above problems, the present invention of claim 1 is a glass run with a bottom wall, a vehicle outer side wall, and a vehicle inner side wall as a basic skeleton, the basic skeleton being attached to a door frame groove portion formed in a door frame, the glass run guiding upward and downward movement of a door glass, in which a vehicle inner side of the vehicle outer side wall is formed with a thick portion that protrudes toward a vehicle inner side, comes into sliding contact with the door glass, and has higher hardness than hardness of a vehicle outer side wall body portion of the vehicle outer side wall.

In the present invention of claim 1, since the thick portion that protrudes toward the vehicle inner side and comes into sliding contact with the door glass is formed on the vehicle inner side of the vehicle outer side wall of the glass run, rigidity of the glass run increases as compared with a case of a vehicle outer side seal lip in the above-described background art, and it is possible to efficiently transmit and dissipate the vibration energy of the door glass at the time of sliding contact with the door glass. As a result, noise due to wind noise can be reduced.

Since the thick portion has higher hardness than hardness of the vehicle outer side wall body portion of the vehicle outer side wall, the rigidity of the glass run can be further increased. As a result, the vibration energy of the door glass can efficiently transmit and be dissipated by the thick portion of the glass run, and noise due to wind noise can be reduced.

Here, the "rigidity of the glass run" is represented by an increase amount of a reaction force from the glass run with respect to a displacement amount of a pressed portion when the glass run is pressed with the door glass. Therefore, "the rigidity of the glass run increases" means that the inclination (gradient) increases in the relationship between the displacement and the reaction force.

In impedance matching between the door glass and the glass run, it is considered that the impedance of the door glass is dominated by the mass of the door glass, and the impedance of the glass run is dominated by the rigidity of the glass run. In a high frequency range of 1 kHz or more where noise reduction by the glass run is expected, the impedance of the door glass is larger than the impedance of the glass run. Therefore, if the impedance of the glass run can be made close to or equal to the impedance of the glass by increasing the rigidity of the glass run, the vibration energy of the door glass can be efficiently transmitted and dissipated in the glass run by impedance matching, so that it is considered that noise due to wind noise can be reduced.

The present invention described in claim 2 is the glass run of the invention of claim 1, wherein the vehicle inner side wall is formed with a vehicle inner side seal lip that extends from a vehicle inner side wall tip end portion or a vehicle outer side between the vehicle inner side wall tip end portion and the bottom wall to a vehicle outer side and the bottom wall side, and having a side surface of a vehicle outer side in sliding contact with the door glass, and a reaction force from a vehicle outer side and a vehicle inner side received by the door glass when the door glass comes into sliding contact with the thick portion and the vehicle inner side seal lip is larger on a vehicle inner side than on a vehicle outer side.

In the present invention described in claim 2, the vehicle inner side wall is formed with a vehicle inner side seal lip extending from the vehicle outer side at a vehicle inner side wall tip end portion or between the vehicle inner side wall tip end portion and the bottom wall to the vehicle outer side and the bottom wall side, and a side surface on the vehicle outer side is in sliding contact with the door glass, and a reaction force from the vehicle outer side and the vehicle inner side received by the door glass when the door glass comes into sliding contact with the thick portion and the vehicle inner side seal lip and moves up and down is larger on the vehicle inner side than that on the vehicle outer side. Therefore, the pressing force to the thick portion of the door glass increases, and the door glass can be displaced to a position where the rigidity of the glass run increases. As a result, the vibration energy of the door glass can be efficiently transmitted and dissipated in the glass run, and noise due to wind noise can be further reduced.

The present invention of claim 3 is the glass run in the invention of claim 1, in which a convex rib is formed on a side surface of a vehicle inner side of the thick portion.

In the present invention of claim 3, since the convex rib is formed on the vehicle inner side surface of the thick portion, it is possible to prevent dust, foreign matters, and the like from being caught in the thick portion when the door glass moves up and down, and to prevent generation of abnormal noise associated with this.

The present invention of claim 4 is the glass run of the invention of claim 1, wherein the vehicle outer side wall is formed with a vehicle outer side seal lip that extends from a vehicle outer side wall tip end portion or a vehicle inner side between the vehicle outer side wall tip end portion and the bottom wall to a vehicle inner side and the bottom wall side, and has a side surface on a vehicle inner side in sliding contact with the door glass, and the vehicle outer side seal lip does not come into contact with the thick portion.

In the present invention of claim 4, since the vehicle outer side wall is formed with a vehicle outer side seal lip extending from the vehicle inner side at a vehicle outer side wall tip end portion or between the vehicle outer side wall tip end portion and the bottom wall to the vehicle inner side and the bottom wall side, and a side surface on the vehicle inner side is in sliding contact with the door glass, it is possible to improve the sealing performance with the door glass, prevent raindrops, dust, and the like from entering, and reduce noise in the glass run penetration route (arrow A in FIG. 7).

Since the vehicle outer side seal lip does not come into contact with the thick portion, it is possible to efficiently transmit and dissipate the vibration energy of the door glass at the time of sliding contact with the door glass in the thick portion. As a result, noise due to wind noise can be reduced.

The present invention of claim 5 is the glass run of the invention of claim 1, in which the vehicle outer side of the vehicle outer side wall is in surface contact with the door frame.

In the present invention of claim 5, since the vehicle outer side of the vehicle outer side wall is in surface contact with the door frame, the rigidity of the vehicle outer side wall can be increased by sandwiching the vehicle outer side wall between the door frame and the door glass. As a result, the vibration energy transmitted to the thick portion is efficiently attenuated, and noise due to wind noise can be reduced.

Since the thick portion protruding toward the vehicle inner side and coming into slide contact with the door glass is formed on the vehicle inner side of the vehicle outer side wall of the glass run, the rigidity of the glass run is increased as compared with the case of the seal lip in the above-described background art, and the vibration energy of the door glass can be efficiently transmitted and dissipated at the time of slide contact with the door glass. As a result, noise due to wind noise can be reduced.

Since the thick portion has higher hardness than hardness of the vehicle outer side wall body portion of the vehicle outer side wall, the rigidity of the glass run can be further increased. As a result, the vibration energy of the door glass can efficiently transmit and be dissipated by the thick portion of the glass run, and noise due to wind noise can be reduced.

DETAILED DESCRIPTION OF PREFERRED EMBODIMENTS

Figure 1:
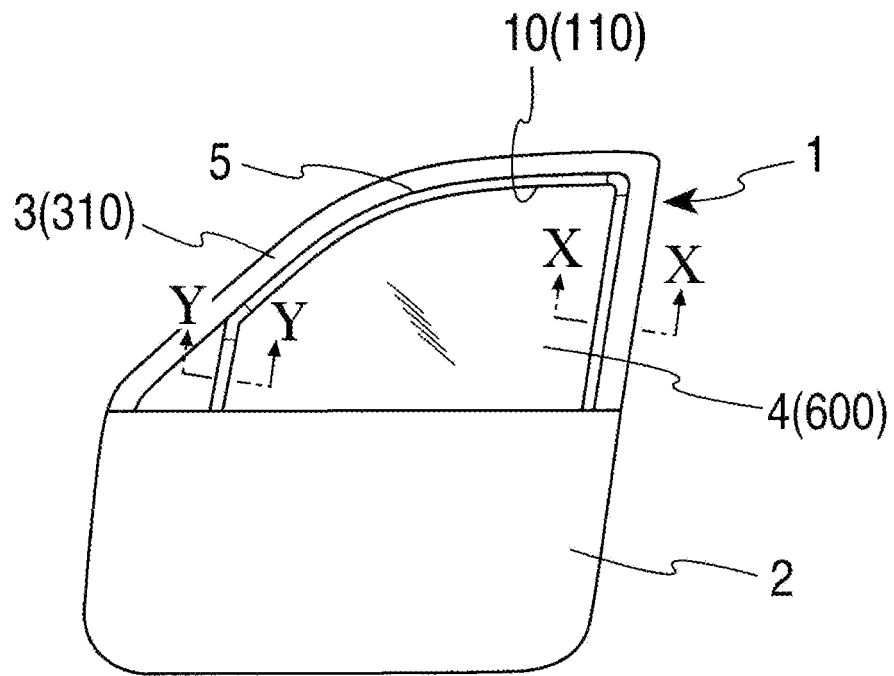
FIG. 1 is a front view of an automobile door.

The first embodiment of the present invention will be described with reference to FIGS. 1 to 5. FIG. 1 is a front view of a left side front door 1 of an automobile as viewed from the vehicle outer side. A door frame 3 is attached to an upper portion of a door body 2 constituting this front door 1. This door frame 3 and the upper end edge of the door body 2 form a window opening. A glass run 10 is attached to an inner peripheral edge of the window opening and an inside of the door body 2 to guide a lifting operation of the door glass 4. The present invention is applicable not only to the left side front door 1 but also to a right side front door and left and right rear doors. The present invention can also be applied to a slide door in which a door glass moves up and down.

Figure 2:
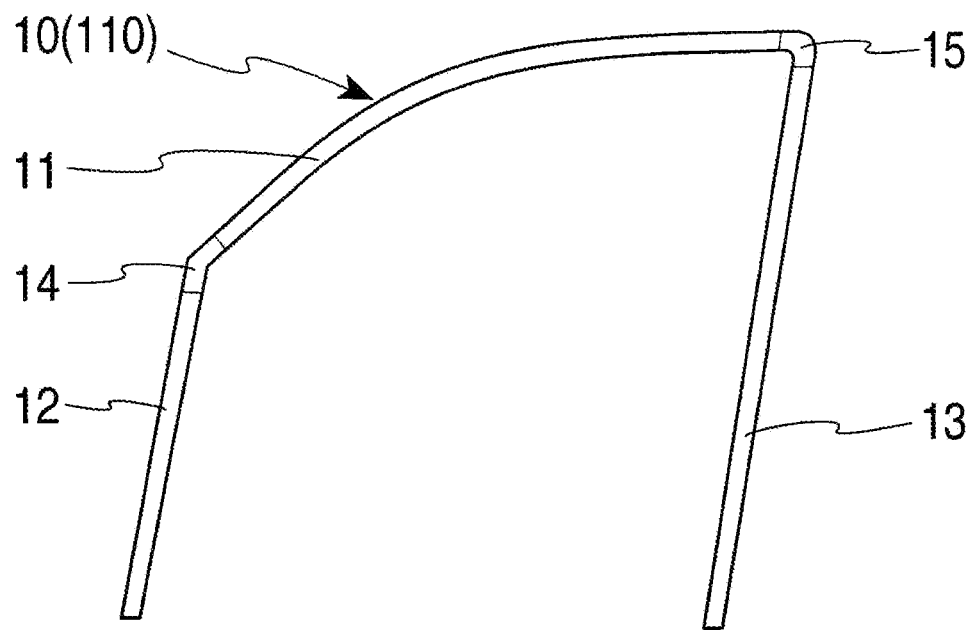
FIG. 2 is a front view showing a glass run used for a door frame of FIG. 1.

FIG. 2 is a front view of only the glass run 10 in a simplified manner as viewed from the vehicle outer side. This glass run 10 includes a first extrusion molding portion 11 corresponding to a lateral frame portion of the door frame 3, a second extrusion molding portion 12 corresponding to a longitudinal frame portion on the front side of the front door 1, and a third extrusion molding portion 13 corresponding to the longitudinal frame portion on the rear side. A front end portion of the first extrusion molding portion 11 is connected to an upper end portion of the second extrusion molding portion 12 by a first die molding portion 14. A rear end portion of the first extrusion molding portion 11 is connected to an upper end portion of the third extrusion molding portion 13 by a second die molding portion 15.

Figure 3:
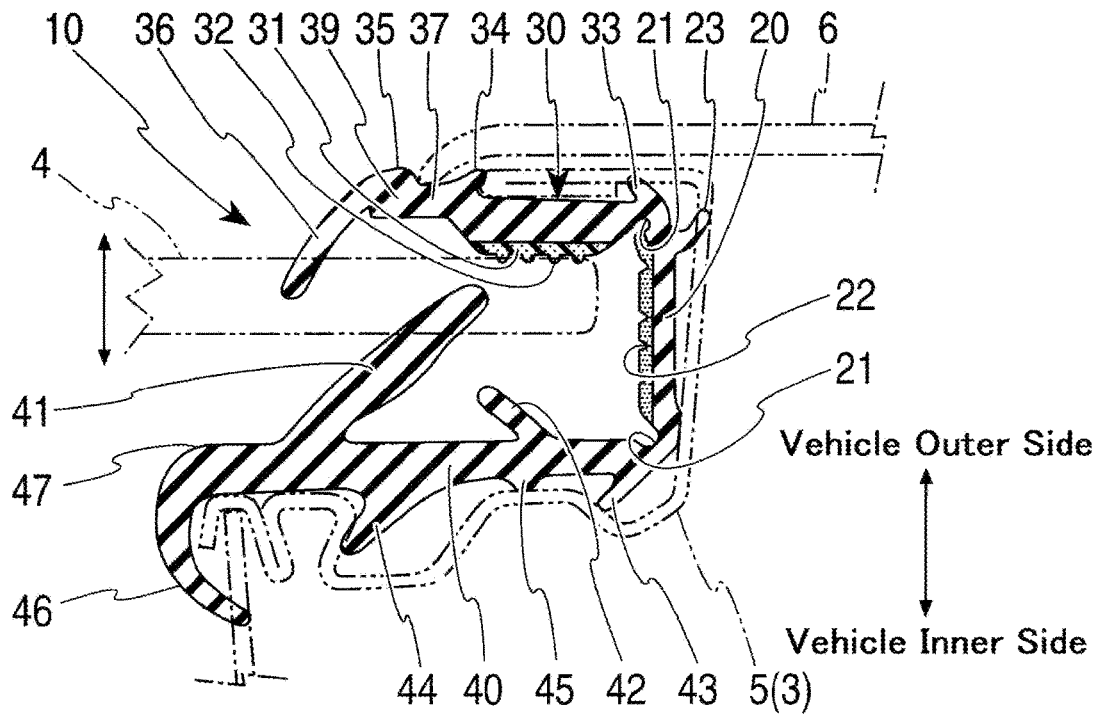
FIG. 3 is a cross-sectional view of a glass run of a first embodiment of the present invention, corresponding to a line X-X in FIG. 1.

FIG. 3 is a cross-sectional view corresponding to the line X-X in FIG. 1. The glass run 10 has a bottom wall 20, a vehicle outer side wall 30, and a vehicle inner side wall 40 as a basic skeleton, and is formed in a channel shape (substantially U-shaped in cross section). A coupling portion of the bottom wall 20, the vehicle outer side wall 30, and the vehicle inner side wall 40 is coupled in a freely expandable manner by groove portions 21 and 21 on the vehicle outer side and the vehicle inner side. The vehicle inner side wall 40 is formed to be larger than the vehicle outer side wall 30, and the vehicle inner side is formed to be large and asymmetric.

The bottom wall 20 is formed in a substantially plate shape, and a plurality of bottom wall recess portions 22 are formed on an inner surface (door glass 4 side) of the bottom wall 20 continuously in the longitudinal direction in parallel. A bottom wall seal lip 23 is formed on an outer surface of the bottom wall 20, and the bottom wall seal lip 23 comes into contact with a channel-shaped (substantially U-shaped in cross section) door frame groove portion 5 formed in the door frame 3 to seal between the bottom wall 20 and the door frame groove portion 5.

On the vehicle outer side of the vehicle outer side wall 30, a first vehicle outer retention lip 33 and a second vehicle outer retention lip 34 that are locked to the door frame groove portion 5 are formed in the vicinity of the coupling portion with the bottom wall 20 and in the tip end portion direction of the vehicle outer side wall 30, and the first vehicle outer retention lip 33 and the second vehicle outer retention lip 34 retain the door frame groove portion 5 formed in a bent manner.

The vehicle inner side of the vehicle outer side wall 30 is formed with a thick portion 31 that protrudes toward the vehicle inner side, comes into sliding contact with the door glass 4, and has a higher hardness than that of a vehicle outer side wall body portion 37 of the vehicle outer side wall 30. In FIG. 3, the vehicle outer side wall body portion 37 of the vehicle outer side wall 30 of the portion forming the thick portion 31 is also formed thick, but the thickness of the vehicle outer side wall body portion 37 is the same as that in the conventional technique, and the thick portion 31 may be formed thick up to the sliding contact position with the door glass 4. By bringing the door glass 4 into sliding contact with the thick portion 31 formed on the vehicle outer side wall 30 and making the hardness of the thick portion 31 higher than that of the vehicle outer side wall body portion 37 of the vehicle outer side wall 30, the difference in rigidity between the door glass 4 and the vehicle outer side wall 30 is reduced, and it is possible to efficiently transmit and dissipate the vibration energy of the door glass 4 to the thick portion 31 by impedance matching. As a result, noise due to wind noise can be reduced.

The vehicle inner side surface of the thick portion 31 is formed with a plurality of convex ribs 32 continuously in the longitudinal direction in parallel. The rib 32 prevents dust, foreign matter, and the like from being caught in the thick portion 31 when the door glass 4 moves up and down, and prevents generation of abnormal noise associated with this.

A vehicle outer side wall tip end portion 39 of the vehicle outer side wall 30 is formed with a cover lip 36 in the door glass 4 direction and toward the side opposite to the bottom wall 20. The cover lip 36 comes into contact with the vehicle outer side surface of the door glass 4 to suppress entry of rainwater and dust into the thick portion 31 and prevent deterioration of the thick portion 31. Sealing property with the door glass 4 is improved.

A locking portion 35 is formed at a root portion of the cover lip 36 toward the vehicle outer side to fix an end portion of a pillar garnish 6 and seal a gap between the pillar garnish 6 and the surface of the door glass 4.

The vehicle outer side of the vehicle outer side wall 30 is in surface contact with the door frame groove portion 5. Therefore, the vehicle outer side wall 30 is sandwiched between the door glass 4 and the door frame 3, and the rigidity of the vehicle outer side wall 30 is increased. As a result, the vibration energy of the door glass 4 can be efficiently transmitted to the vehicle outer side wall 30 by impedance matching, and can be dissipated with high attenuation of the vehicle outer side wall 30 of the glass run 10.

The vehicle outer side of the vehicle inner side wall 40 is formed with a vehicle inner side seal lip 41 extending from between a vehicle inner side wall tip end portion 47 and the bottom wall 20 to the vehicle outer side and the bottom wall 20 side and having a side surface on the vehicle outer side in sliding contact with the door glass 4. The vehicle inner side seal lip 41 is formed to be shorter in length and thicker as compared with the conventional one (FIG. 7) so that the reaction force from the vehicle outer side and the vehicle inner side received by the door glass 4 when the door glass 4 comes into sliding contact with the thick portion 31 of the vehicle outer side wall 30 and the vehicle inner side seal lip 41 becomes larger on the vehicle inner side than on the vehicle outer side, and the pressing force of the door glass 4 toward the thick portion 31 increases.

The most contradictory to the increase in rigidity of the glass run 10 is slidability related to moving up and down of the door glass. That is, when the reaction force from the vehicle inner side seal lip 41 with respect to the door glass 4 becomes too large, moving up and down of the door glass 4, that is, slidability is adversely affected. On the other hand, when the reaction force from the vehicle inner side seal lip 41 with respect to the door glass 4 becomes small, the slidability has no problem, but the pressing force to the thick portion 31 decreases, and the rigidity of the thick portion 31 decreases. Therefore, in the present embodiment, the length and thickness of the vehicle inner side seal lip 41 are adjusted in consideration of slidability and rigidity. The slidability and the rigidity will be described in detail later.

A sub lip 42 is formed on the vehicle outer side of the vehicle inner side wall 40 and on the bottom wall 20 side of the vehicle inner side seal lip 41 in a direction opposite to the vehicle inner side seal lip 41. The tip end portion of the sub lip 42 comes into contact with the vehicle inner side surface of the vehicle inner side seal lip 41, and the vehicle inner side seal lip 41 supports pressing the vehicle inner side of the door glass 4 toward the vehicle outer side.

The vehicle inner side of the vehicle inner side wall 40 is formed with a first vehicle inner side retention lip 43 and a second vehicle inner side retention lip 44 that are locked to a curved portion of the door frame groove portion 5 having a curved portion in the vicinity of the coupling portion with the bottom wall 20 and in the tip end portion direction of the vehicle inner side wall 40. A contact lip 45 is formed between the first vehicle inner side retention lip 43 and the second vehicle inner side retention lip 44. The first vehicle inner side retention lip 43, the second vehicle inner side retention lip 44, and the contact lip 45 retain the vehicle inner side wall 40 in the curved door frame groove portion 5.

The vehicle inner side wall tip end portion 47 of the vehicle inner side wall 40 is formed with a cover lip 46 toward the vehicle inner side. The cover lip 46 comes into contact with the door frame groove portion 5 to prevent entry of rainwater, dust, and noise and improve the sealing property with the door frame groove portion 5.

In the present embodiment, the glass run 10 excluding the thick portion 31 is made of an thermoplastic olefinic elastomer (TPO) having an international rubber hardness degree (IRHD) of 80±5, and the thick portion 31 is made of TPO having an IRHD of 100±5 by extrusion molding.

In the embodiment of the present invention, a material constituting the glass run 10 can be formed of rubber, a thermoplastic elastomer, a soft synthetic resin, or the like. In the case of rubber, ethylene propylene diene rubber (EPDM) is desirable, and as a thermoplastic elastomer, thermoplastic olefinic elastomer (TPO) or thermoplastic vulcanizates (TPV) is desirable from the viewpoint of weather resistance, recycling, cost, and the like.

Figure 4:
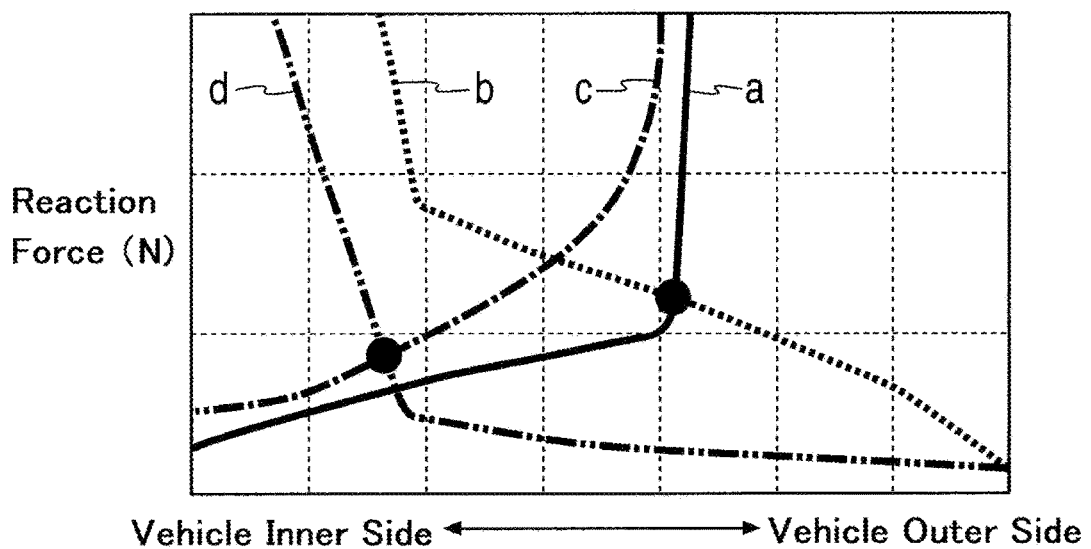
FIG. 4 is a graph showing a position of a door glass and strength of a reaction force from the glass run when the door glass is displaced in the glass run of FIG. 3 and a conventional glass run shown in FIG. 7.
Figure 7:
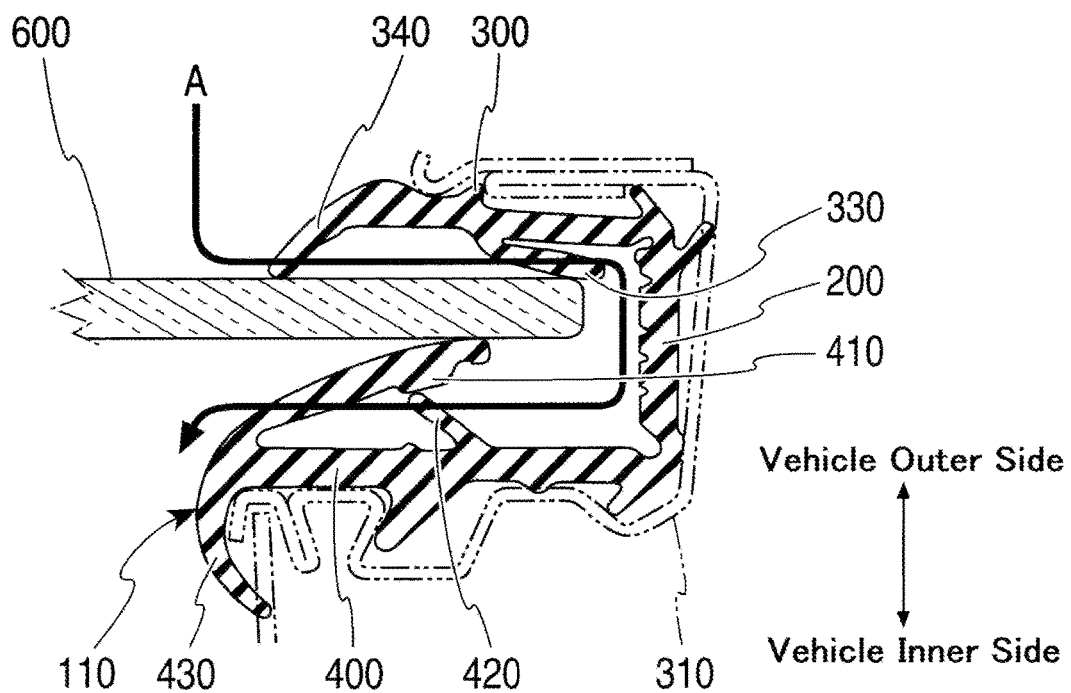
FIG. 7 is a cross-sectional view showing a conventional glass run attachment structure, and is a cross-sectional view corresponding to the line X-X in FIG. 1 (JP 2018-149984 A)

FIG. 4 is a graph in which the position of the door glass and the reaction force from the glass run when the door glass is displaced inside and outside the vehicle in the glass run of FIG. 3 and the conventional glass run shown in FIG. 7 are measured. In the glass run of FIG. 3, the reaction force of the thick portion 31 and the vehicle inner side seal lip 41 are measured, and in FIG. 7, the reaction force of the vehicle outer side seal lip 330 and the vehicle inner side first seal lip 410 are measured. In FIG. 4, a solid line a indicates the reaction force from the vehicle outer side of the present invention (FIG. 3), and a broken line b indicates the reaction force from the vehicle inner side of the present invention (FIG. 3). A dashed line c indicates the reaction force from the vehicle outer side of the conventional technique (FIG. 7), and a double-dotted line d indicates the reaction force from the vehicle inner side of the conventional technique (FIG. 7).

In FIG. 4, it is possible to verify both the rigidity from the inclination at the balance position, that is, the intersection (•) of the reaction forces on the vehicle outer side and the vehicle inner side, and the slidability from the magnitude.

As is clear from FIG. 4, since the inclination of the reaction force a on the vehicle outer side is steeper than the reaction force c of the conventional technique, it is indicated that the rigidity is greatly increased. On the other hand, the magnitude of the reaction force at the balance position (•) on the vehicle outer side and the vehicle inner side is slightly increased with respect to the conventional technique. This indicates that the present invention satisfies the contradictory requirements of rigidity increase and good slidability.

Figure 5:
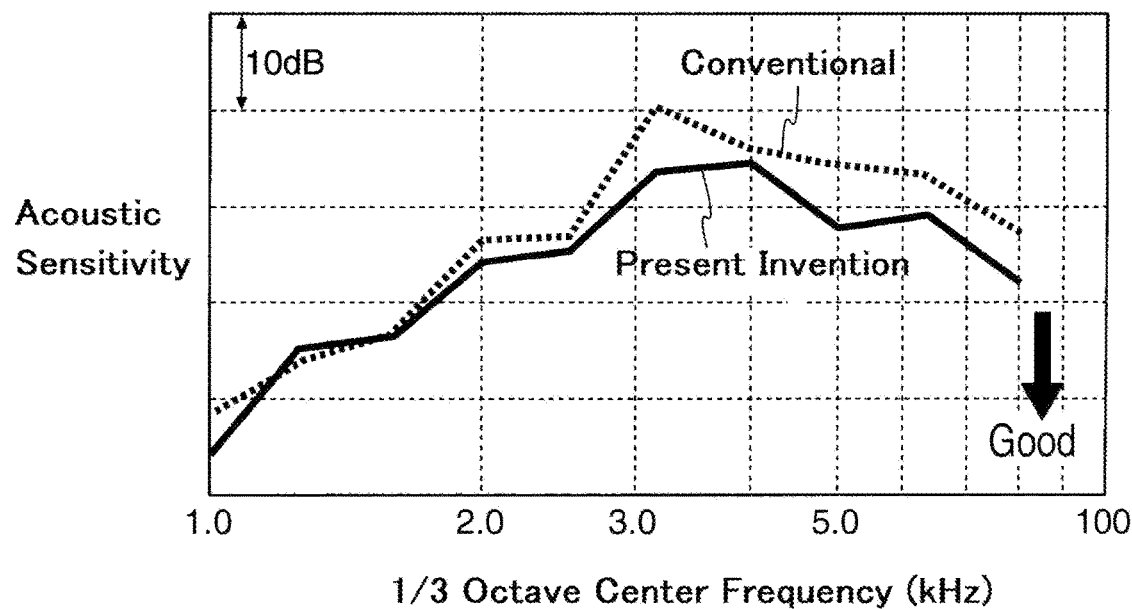
FIG. 5 is a graph showing a comparison of a relationship among a seat ear position of an automobile, a frequency of an outer center of a door glass, and acoustic sensitivity in the glass run of FIG. 3 and the conventional glass run shown in FIG. 7.

FIG. 5 is a graph showing a comparison of the relationship among the seat ear position of an automobile, the frequency of an outer center of a door glass, and acoustic sensitivity in the glass run of present invention shown in FIG. 3 and the conventional glass run shown in FIG. 7. As is clear from FIG. 5, it is indicated that the level of the acoustic sensitivity is reduced particularly in a high frequency range of 3 kHz or more, and the vibration of the door glass is greatly reduced, that is, the noise is reduced.

From the above, the present invention focuses on impedance matching with the door glass, and regarding the glass run, the rigidity of the glass run can be increased by forming a thick portion having hardness higher than that of the vehicle outer side wall body portion on the vehicle outer side wall and bringing the thick portion into sliding contact with the door glass. In particular, by setting the reaction force with respect to the door glass to the vehicle inner side larger than the vehicle outer side, it is possible to greatly reduce vibration of the door glass and reduce noise without affecting the slidability of the door glass.

The present invention does not require changing the material of the glass run, and does not affect other performance (for example, mountability to the door frame and the sealing performance with the door glass regarding prevention of entry of raindrops, dust, and the like) of the glass run.

Figure 6:
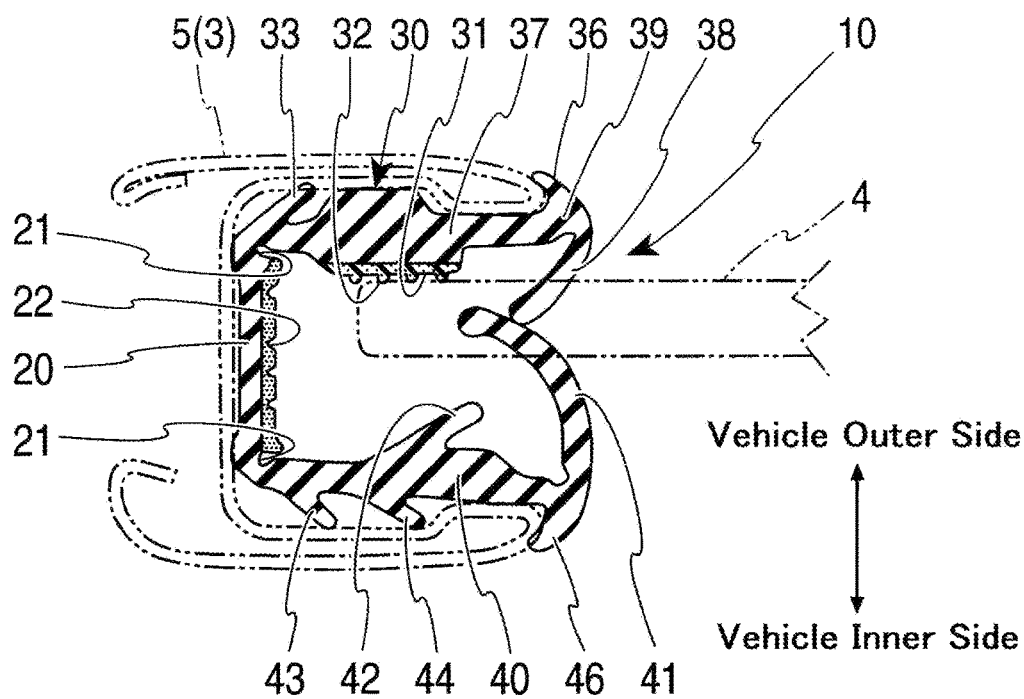
FIG. 6 is a cross-sectional view of a glass run of a second embodiment of the present invention, corresponding to a line Y-Y in FIG. 1.

FIG. 6 is a cross-sectional view of the glass run of the second embodiment of the present invention, corresponding to the line Y-Y in FIG. 1. The difference between the second embodiment and the first embodiment is that, in the second embodiment, the vehicle outer side wall 30 is formed with a vehicle outer side seal lip 38 that extends from the vehicle outer side wall tip end portion 39 to the vehicle inner sides and to the bottom wall 20 side, has a side surface on the vehicle inner side in sliding contact with the door glass 4, and does not come into contact with the thick portion 31.

By forming the vehicle outer side seal lip 38 with which the side surface of the vehicle inner side is in sliding contact with the door glass 4, it is possible to improve the sealing performance with the door glass 4, prevent entry of raindrops, dust, and the like, and reduce noise in the glass run penetration route (arrow A in FIG. 7).

Since the vehicle outer side seal lip 38 does not come into contact with the thick portion 31, similarly to the first embodiment described above, it is possible to efficiently transmit and dissipate the vibration energy of the door glass 4 at the time of sliding contact with the door glass 4 in the thick portion 31. As a result, noise due to wind noise can be reduced.

The present invention includes the following viewpoints in addition to the description of the claims.

The glass run according to claim 3, wherein
the vehicle outer side wall is formed with a vehicle outer side seal lip that extends from a vehicle outer side wall tip end portion or a vehicle inner side between the vehicle outer side wall tip end portion and the bottom wall to a vehicle inner side and the bottom wall side, and has a side surface on a vehicle inner side in sliding contact with the door glass, and the vehicle outer side seal lip does not come into contact with the thick portion.

The glass run according to claim 3 or 4, wherein a vehicle outer side of the vehicle outer side wall is in surface contact with the door frame groove portion.

When the present invention is carried out, it is not limited to the above embodiment, and various modifications can be made without departing from the object of the present invention.

For example, in the above embodiment, the glass run having the structure of FIG. 3 is mounted to the X-X cross section, and the glass run of FIG. 6 is mounted to the Y-Y cross section. However, they may be mounted vice versa or any one of the glass runs may be mounted to the both cross sections.

For example, the glass run of the second embodiment described above can be applied to the first extrusion molding portion in FIG. 2.

Figure 8:
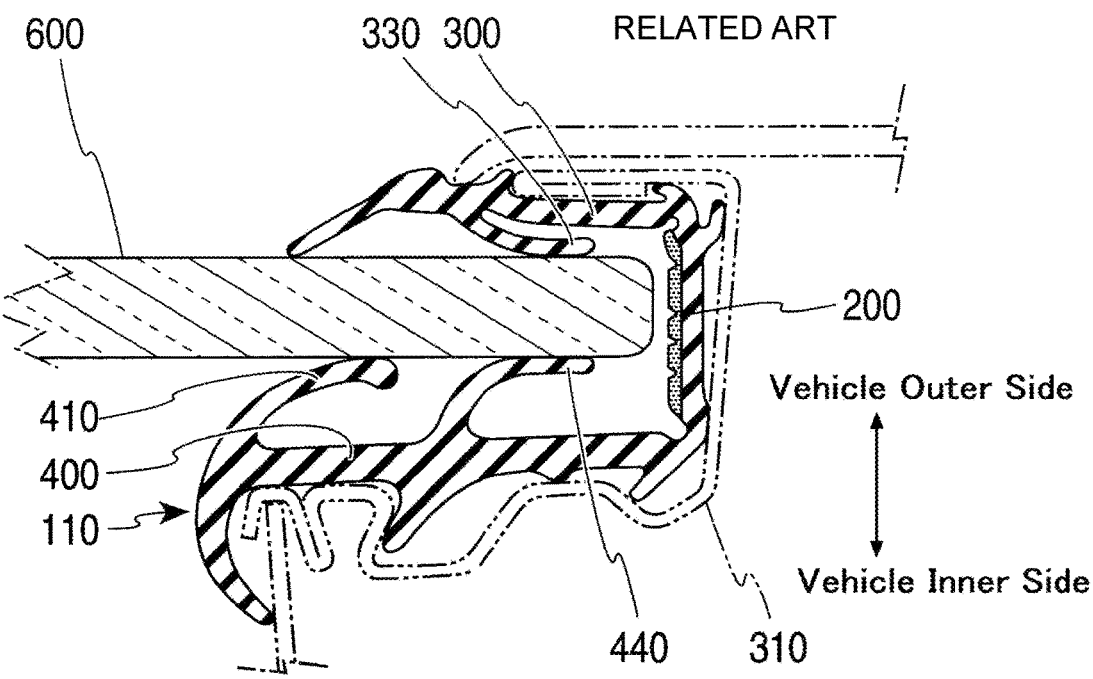
FIG. 8 is a cross-sectional view showing a conventional glass run attachment structure, and is a cross-sectional view corresponding to the line X-X in FIG. 1 (JP 2021-24388 A).

For example, both examples above described an improvement of FIG. 7 as conventional technique, but the present invention may be applied to the vehicle outer sidewall of FIG. 8 as conventional technology.

What is claimed is:

1. A glass run with a bottom wall, a vehicle outer side wall, and a vehicle inner side wall as a basic skeleton, the basic skeleton being attached to a door frame groove portion formed in a door frame, the glass run guiding upward and downward movement of a door glass, wherein a vehicle outer side wall body portion of the vehicle outer side wall includes a stairstep shape with a portion between a distal part of the vehicle outer side wall body portion and a proximal part of the bottom wall side of the vehicle outer side wall body portion protruding to a vehicle inner side, and the portion of the stairstep shape that protrudes to the vehicle inner side is formed with a thick portion in direct contact with and unembedded into the stairstep shape, the thick portion further protrudes toward the vehicle inner side, comes into sliding contact with the door glass, and the thick portion has higher hardness than hardness of the vehicle outer side wall body portion of the vehicle outer side wall.

2. The glass run according to claim 1, wherein the vehicle inner side wall is formed with a vehicle inner side seal lip that extends from a vehicle inner side wall tip end portion or a vehicle outer side between the vehicle inner side wall tip end portion and the bottom wall to a vehicle outer side and the bottom wall side, and having a side surface of a vehicle outer side in sliding contact with the door glass, and a reaction force from a vehicle outer side and a vehicle inner side received by the door glass when the door glass comes into sliding contact with the thick portion and the vehicle inner side seal lip is larger on a vehicle inner side than on a vehicle outer side.

3. The glass run according to claim 1, wherein a convex rib is formed on a side surface of a vehicle inner side of the thick portion.

4. The glass run according to claim 1, wherein the vehicle outer side wall is formed with a vehicle outer side seal lip that extends from a vehicle outer side wall tip end portion or a vehicle inner side between the vehicle outer side wall tip end portion and the bottom wall to a vehicle inner side and the bottom wall side, and has a side surface on a vehicle inner side in sliding contact with the door glass, and the vehicle outer side seal lip does not come into contact with the thick portion.

5. The glass run according to claim 1, wherein a vehicle outer side of the vehicle outer side wall is in surface contact with the door frame groove portion.

6. The glass run according to claim 1, wherein the thick portion is not recessed into the stairstep shape.

7. The glass run according to claim 1, wherein the portion of the stairstep shape that protrudes to the vehicle inner side is thicker than the distal part and the proximal part.

8. The glass run according to claim 1, wherein, on a vehicle outer side of the vehicle outer side wall, a first vehicle outer retention lip is formed adjacent to a location where the bottom wall and the vehicle outer side wall are coupled to each other, and a second vehicle outer retention lip is formed in a tip end portion direction of the vehicle outer side wall, the first vehicle outer retention lip and the second vehicle outer retention lip are adapted to be retained in the door frame groove portion.

9. The glass run according to claim 1, wherein, on a vehicle outer side of the vehicle outer side wall, a first vehicle outer retention lip is formed adjacent to a location where the bottom wall and the vehicle outer side wall are coupled to each other, the first vehicle outer retention lip is adapted to be retained in the door frame groove portion.

10. The glass run according to claim 1, wherein the thick portion has higher hardness than hardness of the distal part and the proximal part and has an impedance that is adapted to match an impedance of the door glass.

11. The glass run according to claim 1, wherein a surface of the thick portion on a vehicle inner side is formed with a plurality of ribs disposed continuously in the longitudinal direction and parallel to each other.

12. The glass run according to claim 1, wherein the thick portion having the higher hardness is formed, continuously in the longitudinal direction, that comes into sliding contact with the door glass.

* * * * *